US006909812B1

(12) United States Patent
Faryar et al.

(10) Patent No.: US 6,909,812 B1
(45) Date of Patent: Jun. 21, 2005

(54) METHODS AND APPARATUS FOR NEARLY LOSSLESS-CONCATENATED BLOCK TRANSFORM CODING

(75) Inventors: Alireza Farid Faryar, Fair Haven, NJ (US); Moushumi Sen, West End, NJ (US); Kyeong Ho Yang, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 695 days.

(21) Appl. No.: 09/615,565

(22) Filed: Jul. 13, 2000

(51) Int. Cl.[7] .............................................. G06K 9/36
(52) U.S. Cl. ...................................................... 382/251
(58) Field of Search ................................ 382/232–253; 375/240–241; 341/50, 67

(56) References Cited

U.S. PATENT DOCUMENTS

| 5,604,494 | A | * | 2/1997 | Murakami et al. ............ 341/50 |
| 6,064,324 | A | * | 5/2000 | Shimizu et al. ............... 341/50 |
| 6,097,838 | A | * | 8/2000 | Klassen et al. .............. 382/167 |
| 6,393,155 | B1 | * | 5/2002 | Bright et al. ................ 382/248 |
| 6,434,197 | B1 | * | 8/2002 | Wang et al. ........... 372/240.29 |
| 6,577,767 | B2 | * | 6/2003 | Lee ............................ 382/236 |

FOREIGN PATENT DOCUMENTS

| EP | 0 590 922 A2 | 4/1994 |
| EP | 0 671 816 A1 | 9/1995 |
| EP | 0 784 410 A2 | 7/1997 |
| GB | 2 344 716 A | 6/2000 |

OTHER PUBLICATIONS

"FCD 14495, Lossless and Near–Lossless Coding of Continuous Tone Still Images," (JPEG–LS), ISO/IEC JTC 1/SC 29/WG 1 FCD 14495—Public Draft, pp. i–75, Jul. 16, 1997.
X. Wu et al., "Context–Based, Adaptive, Lossless Image Coding," IEEE Transactions on Communications, vol. 45, No. 4, pp. 437–444, Apr. 1997.
W. Philips et al., "A Lossless Version of the Hadamard Transform," Proceedings of the ProRISC Workshop on Circuits, Systems and Signal Processing, pp. 387–392, 1997.
Z. Xiong et al., "Space–Frequency Quantization for Wavelet Image Coding," IEEE Transactions Image Processing, vol. 6, pp. 677–693, 1997.
N.D. Memon et al., "Lossless Compression of Video Sequences," IEEE Transactions on Communications, vol. 44, No. 10, pp. 1340–1345, Oct. 1996.
A. Said et al., "A New, Fast, and Efficient Image Codec Based on Set Partitioning in Hierarchical Trees," IEEE Transactions on Circuits and Systems for Video Technology, vol. 6, No. 3, pp. 243–250, Jun. 1996.
"Video Coding for Low Bitrate Communication," International Telecommunication Union, Draft H.263, 54 pages, May 2, 1996.
M.J. Weinberger et al., "Applications of Universal Context Modeling to Lossless Compression of Gray–Scale Images," IEEE Transactions on Image Processing, vol. 5, No. 4, pp. 575–586, Apr. 1996.
H.G. Musmann et al., "Advances in Picture Coding," Proceedings of the IEEE, vol. 73, No. 4, pp. 523–548, Apr. 1985.

\* cited by examiner

*Primary Examiner*—Jingge Wu

(57) ABSTRACT

Methods and apparatus for performing near lossless-concatenated N-level constrained quantization Hadamard transform decoding are provided. Accordingly, the present invention provides a transform-based coding technique, where the coding loss introduced during repeated encoding and decoding is reduced to a substantially insignificant level. This is accomplished by employing a constrained quantization and inverse quantization operation in each level of encoding/decoding in the decoder. In this manner, the concatenation error between each level of a decoder is reduced to a substantially minimum level and the quantization error introduced during quantization operations, i.e., originally at the encoder and in each level of the decoder, is substantially reduced. Thus, the decoded bit stream that is output at the N-th level of the decoder is substantially the same as the original bit stream provided to the input of the encoder.

22 Claims, 3 Drawing Sheets ically distortion free compressed video and still images. One of the issues of interest in lossy coding is one-time coding loss or lossless-concatenated coding, where repeated encoding and decoding of a signal does not introduce errors beyond the quantization error added during the original encoding process. Certain applications involving high quality, perceptually distortion free compressed video or still images require such repeated encoding and decoding operations. For instance, in the case where such originally encoded signals are archived on a storage device for some period of time, it may be desirable to periodically decode the stored video or images, check the
METHODS AND APPARATUS FOR NEARLY LOSSLESS-CONCATENATED BLOCK TRANSFORM CODING The U.S. Government has a paid-up license in this invention and the right in limited circumstances to require the patent owner to license others on reasonable terms as provided for by the terms of NIST cooperative agreement no. 70NANB7H3051 (proposal no. 97-04-0020) entitled: "Enabling Technology for a Digital Video Optical Tape Recorder of High Definition Motion Imagery."

FIELD OF THE INVENTION

The invention relates to video and/or image compression and, more particularly, to methods and apparatus for nearly lossless-concatenated block transform coding in a video and/or image compression system.

BACKGROUND OF THE INVENTION

Lossless and near-lossless image and video compression techniques have generated considerable interest in the video processing community in recent years. Examples of such known techniques have been extensively described in the image and video compression literature, for example: Draft of MPEG-2: Test Model 5, ISO/IEC JTC1/SC29/WG11, April 1993; Draft of ITU-T Recommendation H.263, ITU-T SG XV, December 1995; "Lossless and near-lossless coding of continuous tone still images" (JPEG-LS), ISO/IEC JTC1/SC 29/WG 1, July 1997; B. Haskell, A. Puri, and A. N. Netravali, "Digital video: An introduction to MPEG-2," Chapman and Hall, 1997; H. G. Musmann, P. Pirsch, and H. J. Gralleer, "Advances in picture coding," Proc. IEEE, vol. 73, no. 4, pp. 523–548, April 1985; N. D. Memon and K. Sayood, "Lossless compression of video sequences," *IEEE Trans. Communications*, vol. 44, no. 10, pp. 1340–1345, October 1996; A. N. Netravali and B. G. Haskell, "Digital Pictures: Representation, Compression, and Standards," 2$^{nd}$ Ed., Plenum Press, 1995; W. Philips and K. Denecker, "A Lossless Version of the Hadamard Transform," Proc. Pro-RISC Workshop on Circuits, Systems and Signal Processing, pp. 387–392, 1997; A. Said and W. A. Pearlman, "New, fast, and efficient image codec based on set partitioning in hierarchical trees," *IEEE Trans. Circuit and Systems for Video Technology*, vol. 6, no. 3, pp. 243–249, June 1996; M. J. Weinberger, J. J. Rissanen, and R. B. Arps, "Applications of universal context modeling to lossless compression of gray-scale images," IEEE Trans. Image Processing, vol. 5, no. 4, pp. 575–586, April 1996; X. Wu and N. Memon, "Context-based, adaptive, lossless image coding," IEEE Trans. Communications, vol. 45, no. 4, pp. 437–444, April 1997; and Z. Xiong, K. Ramchandran, and M. T. Orchard, "Space frequency quantization for wavelet image coding," IEEE Trans. Image Processing, vol. 6, 1997.

These conventional techniques have been used in an attempt to generate high quality, perceptually distortion free compressed video and still images. One of the issues of interest in lossy coding is one-time coding loss or lossless-concatenated coding, where repeated encoding and decoding of a signal does not introduce errors beyond the quantization error added during the original encoding process. Certain applications involving high quality, perceptually distortion free compressed video or still images require such repeated encoding and decoding operations. For instance, in the case where such originally encoded signals are archived on a storage device for some period of time, it may be desirable to periodically decode the stored video or images, check the video or images current quality, and then encode it again for storage back on the same or a different storage device. This may be done because of the potential for degradation of the storage device over time, which thus causes a degradation in the quality of the video or images. Also, by way of further example, in the case where the archived video or images are to be edited (e.g., mix, fade, etc), possibly with other signals, the stored information may be decoded each time such that it may be forwarded to an editing facility. The decoded and edited information is then encoded again and returned to the storage device. In any case, a major concern is that such repeated encoding and decoding of the video or images does not introduce errors beyond the quantization error added during the original encoding process.

Context-based coding techniques have been considered in this light, where the status of both the encoder and decoder at any point during the encoding/decoding process is solely determined by the previously reconstructed samples. Repeated encoding/decoding using the same coding parameters thus produced identical bit streams, resulting in lossless-concatenated coding. Context-based coding approaches which have attempted to take this issue into consideration can be roughly classified into two categories: context-based predictive coding in the spatial domain and context-based coding in the wavelet domain. Examples of the spatial domain techniques are discussed in "Lossless and near-lossless coding of continuous tone still images" (JPEG-LS), ISO/IEC JTC1/SC 29/WG 1, July 1997; the Weinberger et al. article; and the Wu et al. article, as mentioned above. Examples of the wavelet domain techniques are discussed in the Memon et al. article; the Said et al. article; and the Xiong et al. article, as mentioned above.

Unfortunately, lossy block transform coding schemes do not exhibit the above property, as will be explained below. Accordingly, it would be highly advantageous to provide a transform-based coding technique, where the coding loss introduced during repeated encoding and decoding is reduced to a substantially insignificant level.

SUMMARY OF THE INVENTION

The present invention provides methods and apparatus for performing near lossless-concatenated N-level transform coding. Such near lossless-concatenated N-level transform coding is accomplished by implementing a transform-based coding methodology using a unique constrained quantization and inverse quantization process, where the coding loss introduced during concatenated coding (repeated encoding and decoding) of a video and/or image signal is reduced to a substantially insignificant level. It is to be appreciated that the transform may be any suitable invertible block transform such as, for example, a Hadamard transform.

More particularly, in accordance with the present invention, a constrained quantization and inverse quantization methodology is used in a decoder to achieve near lossless concatenated coding, where the quantization operation performed on block transformed coefficients is a conditional one. That is, the outcome of the quantization operation is based on the value of the quantized coefficients that are input to the decoder. An illustrative embodiment of a decoder implementing such a constrained quantization and inverse quantization methodology in order to provide near lossless-concatenated N-level transform coding will be explained in detail below.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As used herein, the term "video" or "video sequence" should be understood to include any frame or field sequence which is in a form suitable for encoding in accordance with standards such as, for example, H.261, H.263, Motion-JPEG, MPEG-1, MPEG-2 and MPEG-4. The terms "image" or "picture" as used herein refer to a frame or field of a video sequence. The term "block" as used in accordance with the invention is intended to include not only macroblocks as defined in the above-noted compression standards, but more generally, any grouping of pixel elements in a video frame or field. It is to be appreciated that such a grouping may include a set of pixels or a single pixel.

As mentioned above, the present invention provides a methodology to make block transform encoding/decoding be a nearly lossless-concatenated process. This implies that if repeated encoding and decoding is performed on a n×n block of data, then the loss/error introduced beyond the first encoding/decoding stage is zero or very nearly zero. In the following description, for the sake of ease in explanation, we assume that the invertible block transform operates on 8×8 blocks. However, extension to any other n×n block size is trivial and within the scope of those of ordinary skill in the art, given the inventive teachings herein. The block transformation preferably used is the 2-dimensional Hadamard transform of order 8. This particular transform is described in W. Philips and K. Denecker, "A Lossless Version of the Hadamard Transform," Proc. ProRISC Workshop on Circuits, Systems and Signal Processing, pp. 387–392, 1997, the disclosure of which is incorporated by reference herein. However, as mentioned, any other suitable invertible block transform may be employed.

Figure 1:
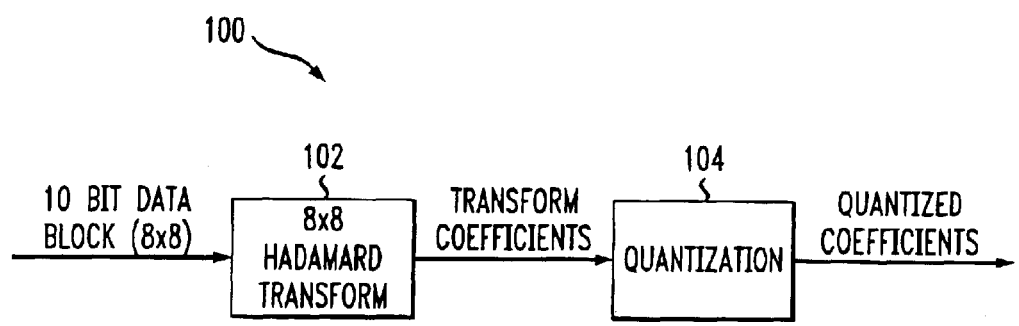
FIG. 1 is a block diagram illustrating a conventional image/video encoder employing a Hadamard transform encoding technique.
Figure 2:
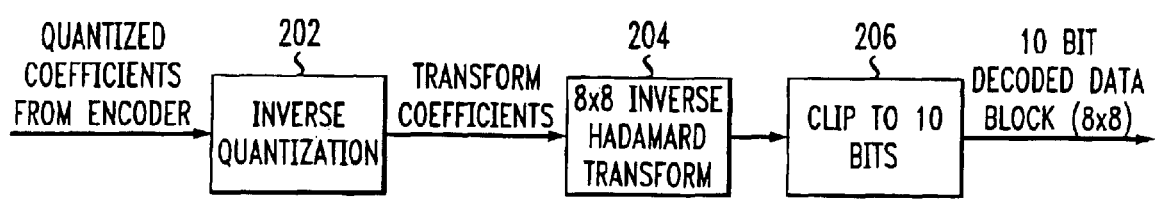
FIG. 2 is a block diagram illustrating a conventional image/video decoder employing an inverse Hadamard transform decoding technique.

Basic conventional encoder and decoder block diagrams are shown in FIG. 1 and FIG. 2, respectively. FIG. 1 is an example of a Hadamard transform encoder 100 comprising an 8×8 Hadamard transform module 102 and a quantization module 104. In operation, a 10-bit block of data is subjected to the application of an 8×8 Hadamard transform (in transform module 102) generating transform coefficients, as is well-known in the art. The coefficients are then quantized in the transform domain (in quantization module 104), as is also well-known in the art. The quantized coefficients may then be coded using context-based coding and transmitted or stored (not shown). It is to be appreciated that the data blocks input to the encoder may be part of an image or a video sequence.

FIG. 2 shows an example of a Hadamard transform decoder 200 comprising an inverse quantization module 202, an 8×8 inverse Hadamard transform module 204 and a clipping module 206. In operation, the quantized coefficients from the encoder are inverse quantized (in inverse quantization module 202) and then inverse transformed back to the pixel domain (in inverse transform module 204) before being clipped to the original range of 10 bits (in clipping module 206), as is well-known in the art. This simple encoding and decoding scheme would introduce error in a significant number of data blocks if the data blocks were repeatedly encoded and decoded.

This is due to the non-linear nature of quantization, resulting in the signal being thrown out of the valid space in the transform domain. For example, if the input signal is an 8×8 block of 10 bit data, in the range [0,1024], then after it has been encoded and decoded, the decoded output is outside the allowable range [0, 1024] if the quantization step size is greater than 1. Thus, the output needs to be clipped to 10 bits, which in turn implies that the next phase of transform and quantization may result in an additional loss of information. According to the present invention, a technique is provided which minimizes this loss to practically insignificant levels. Note that when a signal is repeatedly encoded and decoded, the same quantization value is used on the Hadamard transformed coefficients.

Figure 3:
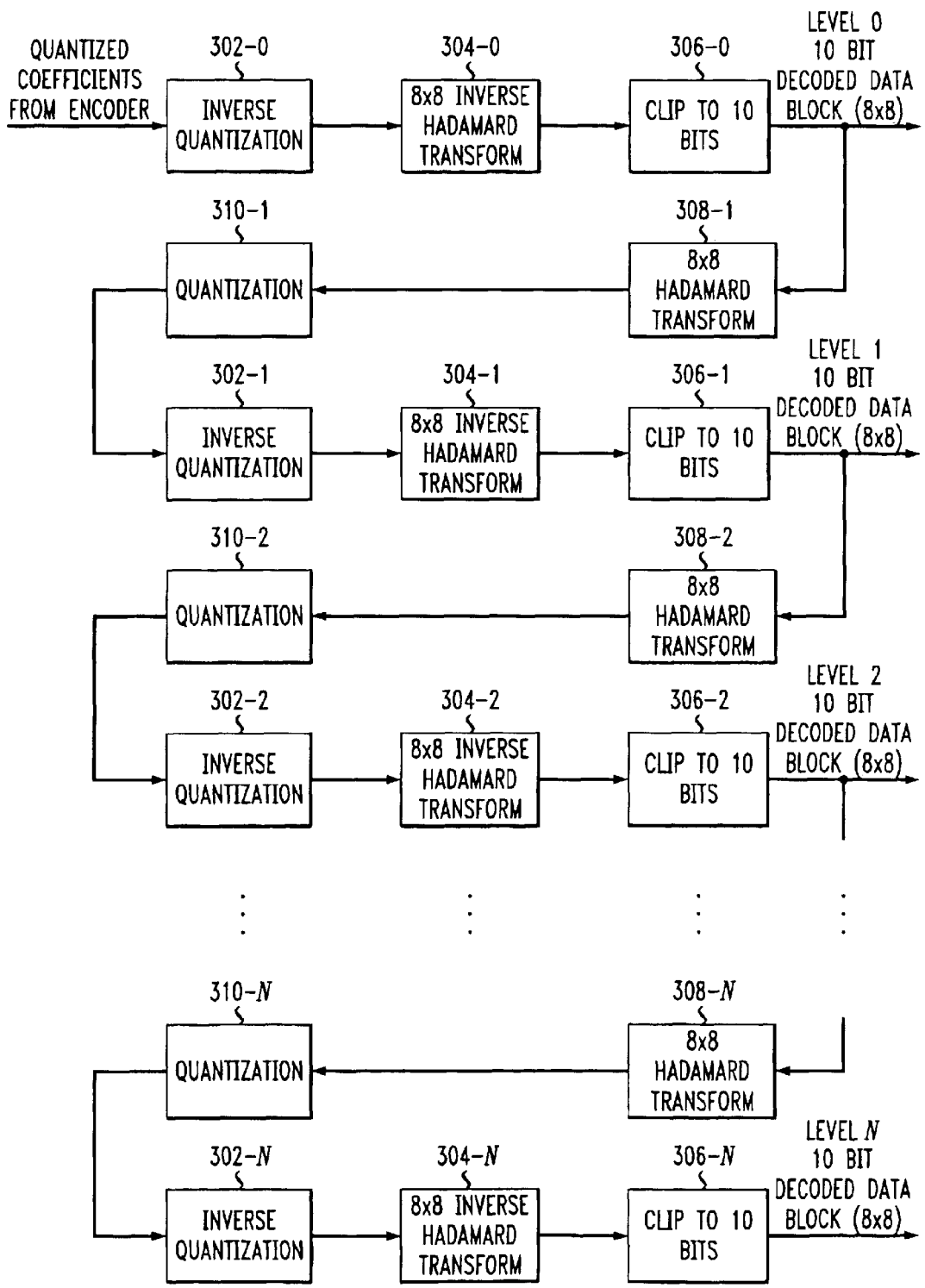
FIG. 3 is a block diagram illustrating the problem associated with repeated encoding and decoding of image/video using a Hadamard transform encoding/decoding technique.

To demonstrate the loss introduced during concatenated coding, we add N stages of encoding/decoding blocks in a decoder. Such a decoder 300 is illustrated in FIG. 3. As shown, the initial level of the decoder (level 0) comprises an inverse quantization module 302-0, an 8×8 inverse Hadamard transform module 304-0 and a clipping module 306-0. The functions of each block are identical to the functions described above with respect to the decoder in FIG. 2. However, in the decoder 300, N encode/decode blocks (levels 1 . . . N) have been added such that the 10 bit decoded output data block from the initial level 0 is provided as input to the level 1 block. The level 1 block output is provided as input to the level 2 block, and so on through level N. As shown, each of the subsequent encode/decode blocks (levels 1 . . . N) comprise an 8×8 Hadamard transform module 308 (308-1 . . . 308-N) and a quantization module 310 (310-1 . . . 310-N) for encoding the output from the previous level, followed by an inverse quantization module 302 (302-1 . . . 302-N), an 8×8 inverse Hadamard transform module 304 (304-1 . . . 304-N) and a clipping module 306 (306-1 . . . 306-N) for decoding the block that was just encoded in the same level. The encoding elements of each block are identical in function to the encoding elements of FIG. 1, while the decoding elements of each block are identical to the decoding elements of FIG. 2.

We found that the higher the number N, the less the number of blocks which suffer additional loss of information due to quantization when subject to repeated encoding and decoding. For example, if N=0, i.e., if there were no extra stages of encode/decode blocks in the decoder, we found that additional quantization error was introduced in approximately 25% of the blocks when these were encoded again. This number went down to a mere 0.002% when N=3, i.e., when 3 stages of encode/decode blocks were added to the decoder. We ran these experiments with quantization step sizes in the range [64, 512] and about 14 million different 8×8 blocks of data. The main problem with this approach of reducing the concatenated coding loss is that a number of the affected blocks showed a significant increase in the quantization error with repeated quantization, as compared to the original data, which is highly undesirable. To offset this problem, the present invention provides a methodology and apparatus which reduces both the number of blocks subject to concatenated coding loss and the quantization error. This inventive approach is illustrated in FIG. 4.

Figure 4:
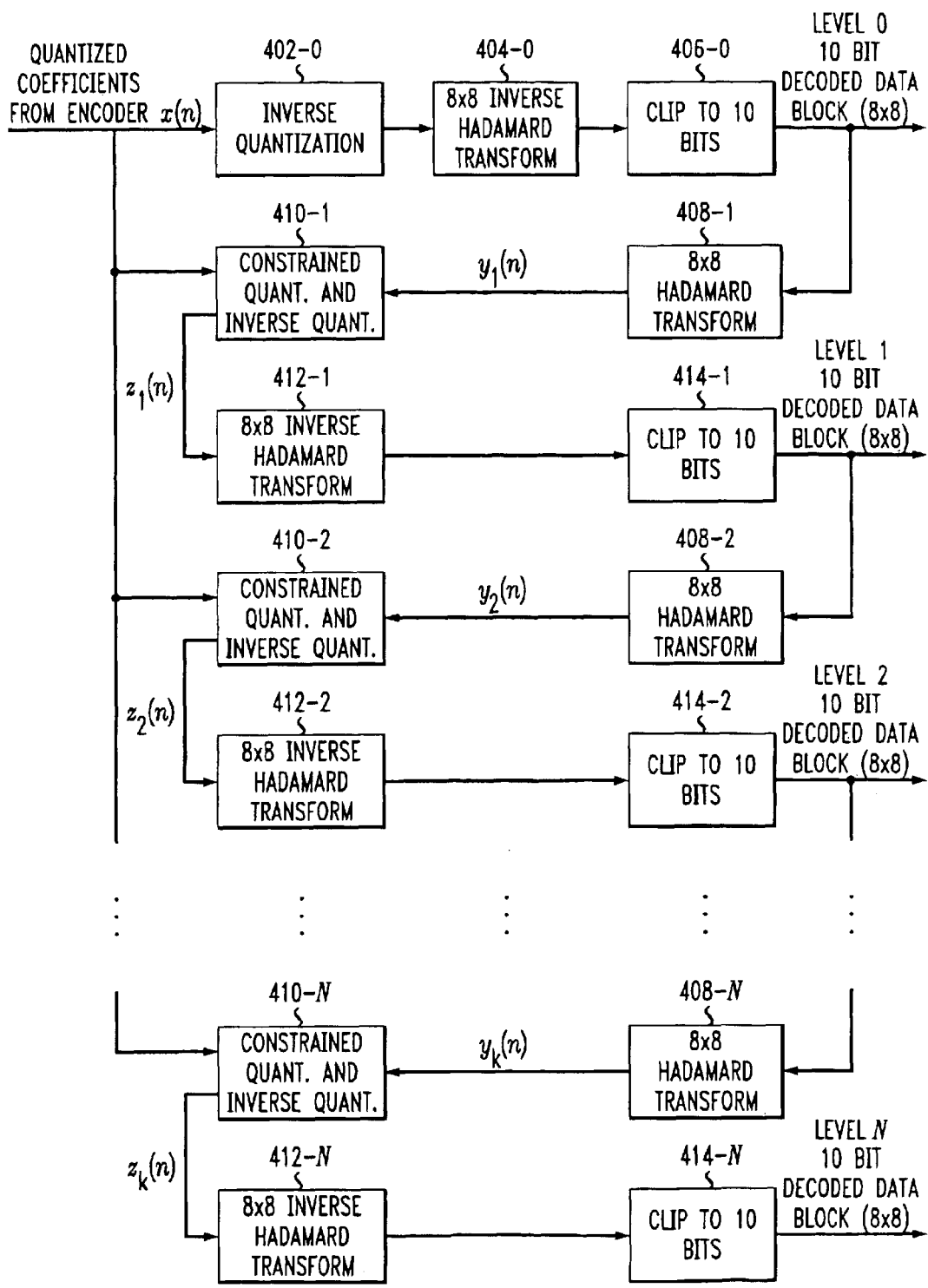
FIG. 4 is a block diagram illustrating an image/video decoder employing a near lossless-concatenated N-level constrained quantization Hadamard transform decoding technique according to an embodiment of the present invention.

Referring now to FIG. 4, a block diagram is shown illustrating an image/video decoder 400 employing a near lossless-concatenated N-level constrained quantization Hadamard transform decoding technique according to an embodiment of the present invention. As shown, the initial level of the decoder 400 (level 0) comprises an inverse quantization module 402-0, an 8×8 inverse Hadamard transform module 404-0 and a clipping module 406-0. The functions of each block are identical to the functions described above with respect to the decoder in FIG. 3. Similar to decoder 300 of FIG. 3, the decoder 400 also has N levels of encode/decode blocks. However, as will be explained below, the decoder 400 employs a "constrained quantization" operation in the subsequent encoding process of each encode/decode block. As in decoder 300, N encode/decode blocks (levels 1 . . . N) have been added in decoder 400 such that the 10 bit decoded output data block from the initial level 0 is provided as input to the level 1 block. The level 1 block output is provided as input to the level 2 block, and so on through level N. As shown, each of the subsequent encode/decode blocks (levels 1 . . . N) comprise an 8×8 Hadamard transform module 408 (408-1 . . . 408-N) and a constrained quantization and inverse quantization module 410 (410-1 . . . 410-N), followed by an 8×8 inverse Hadamard transform module 412 (412-1 . . . 412-N) and a clipping module 414 (414-1 . . . 414-N). With the exception of the constrained quantization and inverse quantization module 410, whose operation will be explained below, the encoding and decoding elements of each block of FIG. 4 are identical in function to the encoding and decoding elements of FIG. 3.

We now explain the operation performed on the transformed coefficients in each constrained quantization and inverse quantization module 410 of the blocks of the decoder 400. Let x(n) be the input to the decoder (quantized coefficients in the transform domain from an encoder such as is shown in FIG. 1), where n=0,1, . . . ,63, for an 8×8 block of data. As can be seen in FIG. 4, x(n) is available to each constrained quantization and inverse quantization module 410 of the decoder as a reference signal. If $y_k(n)$ is the output of a Hadamard transform module 408 at any stage k, k=1, 2, . . . , N, then the constrained quantization and inverse quantization operation performed on $y_k(n)$ yields $z_k(n)$ according to the following rule:

$$z_k(n) = y_k(n) \quad \text{if } Q(y_k(n)) = x(n)$$
$$= x(n) * q \quad \text{if } Q(y_k(n)) \neq x(n)$$

where q is the quantization step size used for the current block, and $Q(y_k(n))$ represents the quantized value of $y_k(n)$. Thus, x(n) is the constraint or reference against which the quantization of the output $y_k(n)$ of module 408 is performed in module 410. In the absence of concatenated coding loss, i.e., if there is no new error introduced after clipping (module 406) the output of the inverse Hadamard transform (module 404) to 10 bits, then $y_k(n)=x(n)*q$ and $z_k(n)=y_k(n)$. Under the presence of concatenated coding loss however, $y_k(n) \neq x(n)*q$, and two situations arise. If $Q(y_k(n))=x(n)$, then module 410 does not perform any quantization, and its output $z_k(n)=y_k(n)$. But in the case when $Q(y_k(n)) \neq x(n)$, the output $z_k(n)$ of module 410 is set to x(n), i.e., $z_k(n)=x(n)*q$.

Let us consider a simple example to explain the above situation. Let the quantization parameter be q=5, and let the reference signal be x(n)=3. Then, three situations may arise. In the absence of concatenated coding loss, the output of the Hadamard transform block, module 408, will be $y_k(n)=15$, by definition, so that $Q(y_k(n))=x(n)=3$ and the output of module 410 would be $z_k(n)=15$, i.e., $z_k(n)=y_k(n)$. In the second situation, let $y_k(n)=17$, i.e., concatenated coding loss is present since $y_k(n) \neq x(n)*q$, but $Q(y_k(n))=x(n)=3$. In this case, we do not perform any quantization, and the output to module 410 remains identical to its input, i.e., $z_k(n)=17$. In the third and final situation, let $y_k(n)=12$, i.e., like in the previous case, there is concatenated coding loss, but also $Q(y_k(n))=2$, so that $Q(y_k(n)) \neq x(n)$. In this case, we constrain the output $z_k(n)$ to equal the reference signal, i.e., $z_k(n)=x(n)*q=15$.

As illustrated above, it is to be appreciated that the conventional operations of quantization and inverse quantization, as may be respectively performed by modules 310 and 302 in FIG. 3, are replaced by the constrained quantization and inverse quantization technique of the invention in accordance with the above-specified rule, which is performed by the N modules 410 of FIG. 4.

We found that when k=3, i.e., after 3 stages of encode/decode blocks, approximately 3% of the blocks still suffered additional quantization error when subject to concatenated encoding/decoding. We also observed the desirable effect that the quantization error was approximately half of that obtained when these blocks were simply subject to repeated encoding and decoding as demonstrated in the decoder of FIG. 3 and that this error value remained steady despite repeated encoding/decoding. We conclude that the majority of the blocks are lossless-concatenated, and although the remaining data blocks do suffer some concatenated coding loss, no perceptible degradation in quality was observed in these blocks as the error asymptotically approaches a small value.

After the transform coefficients are subjected to the constrained quantization and inverse quantization operation in accordance with the rule above, they are then inverse transformed and clipped to 10 bits in each level of the N-level decoder as described above.

Note that the computational complexity of the N-level decoder algorithm of the invention, as illustrated by the embodiment of FIG. 4, is considerably less than N-times that of the generic Hadamard transform decoder of FIG. 2. This is because, at each iteration, only a small fraction of the total number of input data blocks display concatenated coding loss and only these blocks are subject to the N stages of encoding/decoding as shown in FIG. 3 and FIG. 4.

It should be noted that the elements of the encoders and decoders illustrated in the figures may be respectively implemented using a central processing unit, microprocessor, application-specific integrated circuit or other data processing device in, for example, a computer, video transceiver, cable system headend, television set-top box or other type of video signal processor. The central processing unit, microprocessor, application-specific integrated circuit or other data processing device may also have memory associated therewith for storing data and results associated with each element's function when necessary. The invention may be utilized in conjunction with numerous types of video processing or transmission systems. Thus, while the invention is illustrated above using an exemplary video coding system, it should be understood that the invention is not limited to use with any particular type of video signal format, video coding standard or coding system configuration. The invention is instead more generally applicable to any video coding system in which it is desirable to perform block transform coding such that the coding loss introduced during repeated encoding and decoding is reduced to a substantially insignificant level. Also, it is to be appreciated that the invention may be implemented in accordance with a single device where the encoder and decoder are co-located, i.e., a "codec" (encoding/decoding) device.

Accordingly, as has been explained and illustrated, the present invention provides methods and apparatus for nearly lossless-concatenated block transform coding in a video and/or image compression system. That is, the concatenation error between each level of a decoder is reduced to a substantially minimum level and the quantization error introduced during quantization operations, i.e., originally at the encoder and in each level of the decoder, is substantially reduced. Thus, the decoded bit stream that is output at the N-th level of the decoder is substantially the same as original bit stream provided to the input of the encoder.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a block transform-based decoder, the decoder receiving a signal generated by a block transform-based encoder, the signal representing one or more quantized coefficients associated with at least one block of visual data, and the decoder decoding the signal to yield a decoded visual data block, the method comprising the steps of:
   transforming the decoded visual data block to yield a transformed data block; and
   applying a constrained quantization and inverse quantization operation to the transformed data block, the constrained quantization operation being conditioned on a comparison of the signal received by the decoder to the transformed data block, the constrained quantization and inverse quantization operation yielding a partially decoded output signal.

2. The method of claim 1, wherein the partially decoded output signal $z_k(n)$ resulting from the constrained quantization and inverse quantization operation is equivalent to: $y_k(n)$ when $Q(y_k(n))$ $x(n)$, where $y_k(n)$ represents the transformed data block, $Q(y_k(n))$ represents the quantized value of $y_k(n)$ and $x(n)$ represents the signal received by the decoder; and $x(n)*q$ when $Q(y_k(n)) \neq x(n)$, where q represents the quantization step size used for a current block.

3. The method of claim 1, wherein the partially decoded output signal $z_k(n)$ resulting from the constrained quantization and inverse quantization operation is equivalent to $y_k(n)$ in an absence of concatenated coding loss, where $y_k(n)$ represents the transformed data block.

4. The method of claim 1, wherein the partially decoded output signal $z_k(n)$ resulting from the constrained quantization and inverse quantization operation is equivalent to $y_k(n)$ in a presence of concatenated coding loss and when $Q(y_k(n))=x(n)$, where $y_k(n)$ represents the transformed data block, $Q(y_k(n))$ represents the quantized value of $y_k(n)$ and $x(n)$ represents the signal received by the decoder.

5. The method of claim 1, wherein the partially decoded output signal $z_k(n)$ resulting from the constrained quantization and inverse quantization operation is equivalent to $x(n)*q$ in a presence of concatenated coding loss and when $Q(y_k(n)) \neq x(n)$, where $y_k(n)$ represents the transformed data block, $Q(y_k(n))$ represents the quantized value of $y_k(n)$, $x(n)$ represents the signal received by the decoder, and q represents the quantization step size used for a current block.

6. The method of claim 1, further comprising the step of inverse transforming the partially decoded output signal to yield a decoded output signal.

7. The method of claim 6, further comprising the step of clipping the decoded output signal to a predetermined number of bits.

8. The method of claim 7, further comprising the step of repeating the transforming, applying, inverse transforming and clipping steps N times.

9. The method of claim 1, wherein the block transform is an invertible block transform.

10. The method of claim 9, wherein the invertible block transform is a Hadamard transform.

11. Apparatus for use in a block transform-based decoder, the decoder receiving a signal generated by a block transform-based encoder, the signal representing one or more quantized coefficients associated with at least one block of visual data, and the decoder decoding the signal to yield a decoded visual data block, the apparatus comprising:
   at least one processing device operative to: (i) transform the decoded visual data block to yield a transformed data block; and (ii) apply a constrained quantization and inverse quantization operation to the transformed data block, the constrained quantization operation being conditioned on a comparison of the signal received by the decoder to the transformed data block, the constrained quantization and inverse quantization operation yielding a partially decoded output signal.

12. The apparatus of claim 11, wherein the partially decoded output signal $z_k(n)$ resulting from the constrained quantization and inverse quantization operation is equivalent to: $y_k(n)$ when $Q(y_k(n))=x(n)$, where $y_k(n)$ represents the transformed data block, $Q(y_k(n))$ represents the quantized value of $y_k(n)$ and $x(n)$ represents the signal received by the decoder; and $x(n)*q$ when $Q(y_k(n)) \neq x(n)$, where q represents the quantization step size used for a current block.

13. The apparatus of claim 11, wherein the partially decoded output signal $z_k(n)$ resulting from the constrained quantization and inverse quantization operation is equivalent to $y_k(n)$ in an absence of concatenated coding loss, where $y_k(n)$ represents the transformed data block.

14. The apparatus of claim 11, wherein the partially decoded output signal $z_k(n)$ resulting from the constrained quantization and inverse quantization operation is equivalent to $y_k(n)$ in a presence of concatenated coding loss and when $Q(y_k(n))=x(n)$, where $y_k(n)$ represents the transformed data block, $Q(y_k(n))$ represents the quantized value of $y_k(n)$ and $x(n)$ represents the signal received by the decoder.

15. The apparatus of claim 11, wherein the partially decoded output signal $z_k(n)$ resulting from the constrained quantization and inverse quantization operation is equivalent to $x(n)*q$ in a presence of concatenated coding loss and when $Q(y_k(n)) \neq x(n)$, where $y_k(n)$ represents the transformed data block, $Q(y_k(n))$ represents the quantized value of $y_k(n)$, $x(n)$ represents the signal received by the decoder, and q represents the quantization step size used for a current block.

16. The apparatus of claim 11, wherein the at least one processing device is further operative to inverse transform the partially decoded output signal to yield a decoded output signal.

17. The apparatus of claim 16, wherein the at least one processing device is further operative to clip the decoded output signal to a predetermined number of bits.

18. The apparatus of claim 17, wherein the at least one processing device is further operative to repeat the transforming, applying, inverse transforming and clipping operations N times.

19. The apparatus of claim 11, wherein the block transform is an invertible block transform.

20. The apparatus of claim 19, wherein the invertible block transform is a Hadamard transform.

21. Apparatus for use in a block transform-based decoder, the decoder receiving a signal generated by a block transform-based encoder, the signal representing one or more quantized coefficients associated with at least one block of visual data, and the decoder decoding the signal to yield a decoded visual data block, the apparatus comprising:

a data block transformer operative to transform the decoded visual data block to yield a transformed data block; and a quantizer coupled to the data block transformer and operative to apply a constrained quantization and inverse quantization operation to the transformed data block, the constrained quantization operation being conditioned on a comparison of the signal received by the decoder to the transformed data block, the constrained quantization and inverse quantization operation yielding a partially decoded output signal.

22. A block transform-based decoder, the decoder receiving a signal generated by a block transform-based encoder, the signal representing one or more quantized coefficients associated with at least one block of visual data, and the decoder decoding the signal to yield a decoded visual data block, the decoder comprising:

N encode/decode paths, wherein each encode/decode path includes:

a data block transformer operative to transform a previously decoded visual data block to yield a transformed data block;

a quantizer coupled to the data block transformer and operative to apply a constrained quantization and inverse quantization operation to the transformed data block, the constrained quantization operation being conditioned on a comparison of the signal received by the decoder to the transformed data block, the constrained quantization and inverse quantization operation yielding a partially decoded output signal;

a data block inverse transformer coupled to the quantizer and operative to inverse transform the partially decoded output signal to yield a decoded output signal; and a clipping module coupled to the data block inverse transformer and operative to clip the decoded output signal to a predetermined number of bits.

* * * * *

UNITED STATES PATENT AND TRADEMARK OFFICE
CERTIFICATE OF CORRECTION

PATENT NO. : 6,909,812 B1
DATED : June 21, 2005
INVENTOR(S) : Faryar et al.

It is certified that error appears in the above-identified patent and that said Letters Patent is hereby corrected as shown below:

Column 7,
Line 43, delete "$Q(y_k(n))\ x(n)$" and insert -- $Q(y_k(n))=x(n)$ --.

Signed and Sealed this

Sixteenth Day of August, 2005

JON W. DUDAS
*Director of the United States Patent and Trademark Office*